United States Patent [19]

Butscher

[11] 4,389,846
[45] Jun. 28, 1983

[54] AIR SUPPLY AND FUEL VOLUME CONTROL ARRANGEMENT FOR AN AUXILIARY COMBUSTION CHAMBER OF A SUPERCHARGED INTERNAL COMBUSTION ENGINE

[75] Inventor: Franz Butscher, Friedrichshafen, Fed. Rep. of Germany

[73] Assignee: Motor-und Turbinen-Union GmbH, Fed. Rep. of Germany

[21] Appl. No.: 318,369

[22] Filed: Nov. 5, 1981

Related U.S. Application Data

[63] Continuation of Ser. No. 86,679, Oct. 19, 1979, abandoned.

[30] Foreign Application Priority Data

Nov. 7, 1978 [DE] Fed. Rep. of Germany ....... 2848199

[51] Int. Cl.$^3$ .............................................. F02C 6/12
[52] U.S. Cl. ...................................................... 60/606
[58] Field of Search .......................... 60/605, 606, 614

[56] References Cited

U.S. PATENT DOCUMENTS

| | | | |
|---|---|---|---|
| 2,379,455 | 7/1945 | Prince | 60/606 X |
| 3,988,894 | 11/1976 | Melchior | 60/606 |
| 4,018,053 | 4/1977 | Rudert et al. | 60/606 |
| 4,114,379 | 9/1978 | Melchior et al. | 60/606 |
| 4,160,365 | 7/1979 | Petrov et al. | 60/606 |

Primary Examiner—Michael Koczo
Attorney, Agent, or Firm—Craig & Burns

[57] ABSTRACT

An arrangement for controlling a supply of air and a volume of fuel to an auxiliary combustion chamber associated with a supercharged internal combustion engine. The auxiliary combustion chamber being adapted to periodically deliver additional exhaust gas to an exhaust gas turbine of the supercharger as a function of an instantaneous exhaust gas volume from the internal combustion engine. A sensor is disposed in a charging air line of the internal combustion engine for influencing a pressure detector which delivers an actual value signal corresponding to the instantaneous charging air pressure. The signal reaching a comparator by way of an input amplifier, in which comparator the signal is compared with a guide parameter delivered by a fixed value adjustment device and corresponding to the desired constant charging air pressure. The resultant differential between the desired constant charging air pressure and the actual value forms an input signal for a proportional regulator whose output signal is fed to two curve adjustment elements which are respectively connected in series with an air supply regulator and/or a force amplifier to control the fuel volume.

7 Claims, 1 Drawing Figure

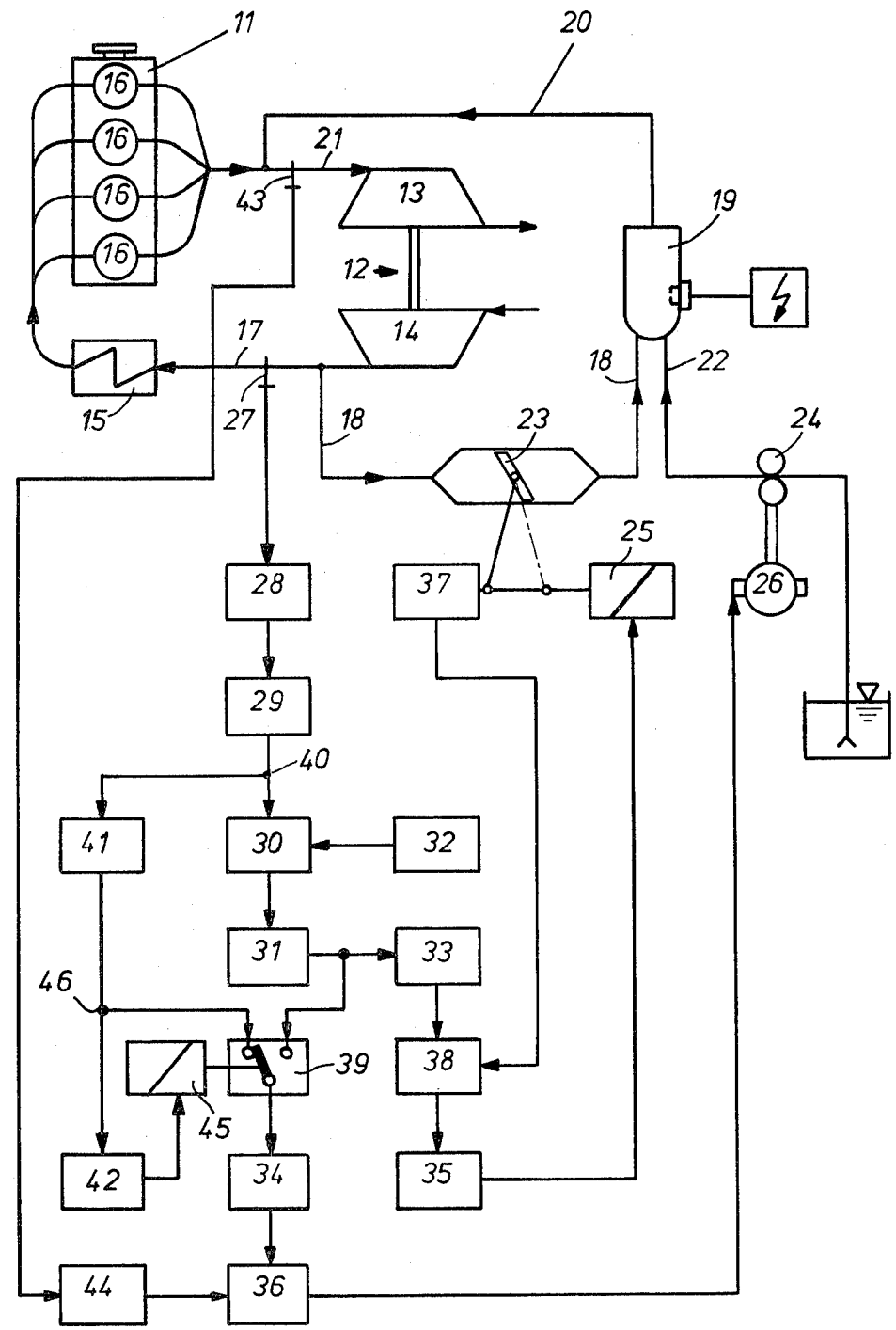

AIR SUPPLY AND FUEL VOLUME CONTROL ARRANGEMENT FOR AN AUXILIARY COMBUSTION CHAMBER OF A SUPERCHARGED INTERNAL COMBUSTION ENGINE

This is a continuation of application Ser. No. 86,679, filed Oct. 19, 1979, now abandoned.

The present invention relates to a control arrangement, and, more particularly, to an air supply and fuel volume control arrangement for an auxiliary combustion chamber of a supercharged internal combustion engine, which auxiliary combustion chamber periodically delivers additional exhaust gas to an exhaust gas turbine of the supercharger as a function of the instantaneous exhaust gas volume from the internal combustion engine so that, during operation of the auxiliary combustion chamber, the supercharger is capable of producing a constant charging air pressure which does not exceed the charging air pressure which results solely from the volume of exhaust gas from the internal combustion engine under a full load.

An internal combustion engine with an auxiliary combustion chamber of the aforementioned type has been proposed wherein the control of the air supply and fuel is accomplished purely mechanically. For example, the influence of the various parameters such as the set value and limiting value of the charging air pressure upon the relationship between the internal combustion engine and the auxiliary combustion chamber is accomplished by a special cam designed for the specific operating conditions of the specific internal combustion engine.

However, a disadvantage of such proposed control arrangement resides in the fact that the shape of the cam must be determined anew for each combination of the internal combustion engine and an auxiliary combustion chamber so that it is not possible to use such type control universally. Consequently, such a control and adjustment of the internal combustion engine requires costly test runs on test stands making production highly uneconomical. Moreover, it has been found that a mechanical operating control arrangement suffers from a considerable lag in response time and not all influential operating parameters can be taken into account in order to obtain an obtumum adjustment of the internal combustion engine.

The aim underlying the present invention essentially resides in providing a control arrangement for controlling an air supply and fuel quantity to an auxiliary combustion chamber of a supercharged internal combustion engine by which an improved fork curve is obtained for the internal combustion engine at low speed values without increasing the maximum power of the internal combustion engine.

In accordance with the present invention, a sensor is disposed in the charging air line of the internal combustion engine which sensor influences a pressure detector constructed so as to deliver an actual value signal corresponding to the instantaneous charging air pressure. The actual value signal reaches a comparator wherein the actual value signal is compared with a guide parameter delivered by a fixed value adjustment device and corresponding to the desired constant charging air pressure. A resultant differential between the actual value signal and the guide parameter forms an input signal for a proportional regulator whose output signal is fed to two curve adjustment elements for shaping with the elements being connected in series respectively with an air supply regulator and/or a force amplifier so as to control the fuel volume to the auxiliary combustion chamber.

In accordance with advantageous features of the present invention, an automatic reverser, which changes position when the charging air pressure reaches a predetermined limiting value, is disposed in series with the curve adjusting element to control the fuel volume so that, before an operation of the auxiliary combustion chamber begins and until the predetermined limiting value is reached, the actual value signal, which is de-coupled between the input amplifier and comparator and is guided by way of an intermediate amplifier, influences the force amplifier for fuel volume control and the output signal of the proportional regulator only acts on the force amplifier for fuel supply after the reverser has changed position.

Moreover, according to the present invention, a sensor of a temperature limiting value detector may be disposed at an inlet of the exhaust turbine with the sensor delivering a limiting value signal which also influences the force amplifier so as to control the fuel volume.

Also, a fuel pump is provided for supplying fuel to the auxiliary combustion chamber with the fuel pump being driven by a motor the rotational speed of which is variable so as to control the quantity or volume of fuel supplied to the combustion chamber.

A throttle valve is disposed in a line which supplies combustion air to the auxiliary combustion chamber with the position of the throttle valve being controlled by a controlable drive means.

In accordance with yet further features of the present invention, a position sensor is provided for monitoring a position of the throttle valve and for providing to the input of the air supply regulator an actual value signal which corresponds to the throttle valve position.

By virtue of the features of the present invention, a simple adjustability is obtained and the control arrangement is universally applicable to various internal combustion engines. Moreover, the use of a logic circuit permits only very slight lag in the control and a desired torque curve for an internal combustion engine can realiably be accomplished. Also, by comparison with mechanical control arrangements, there are fewer parts thereby resulting in a reduction of the overall cost, space, and weight of the control arrangement. Furthermore, with the control arrangement of the present invention, additional influential parameters may be simply and realiably taken into account in the construction of the control circuit.

Accordingly, it is an object of the present invention to provide a control arrangement for controlling an air supply and fuel volume to an auxiliary combustion chamber of a supercharged internal combustion engine which avoids, by simple means, the shortcomings and disadvantages encountered with prior art mechanical control arrangements.

Another object of the present invention resides in providing a control arrangement for controlling the air supply and fuel volume to an auxiliary combustion chamber of a supercharged internal combustion engine which minimizes the lag in response time of the over all arrangement.

Yet another object of the present invention resides in providing a control arrangement for controlling the air supply and fuel quantity to an auxiliary combustion chamber of a supercharged internal combustion engine which may be universally employed.

A further object of the present invention resides in providing a control arrangement for controlling the air supply and fuel quantity to an auxiliary combustion chamber of a supercharged internal combustion engine wherein the air supply and fuel volume can be regulated independently of one another.

A still further object of the present invention resides in providing a control arrangement for controlling the air supply and fuel quantity to an auxiliary combustion chamber with supercharged internal combustion engine which is simple in construction and therefore relatively inexpensive to manufacture.

Another object of the present invention resides in providing a control arrangement for controlling the air supply and fuel quantity to an auxiliary combustion chamber of a supercharged internal combustion engine which functions reliably under all operating conditions.

These and other objects, features, and advantages of the present invention will become more apparent from the following description when taken in connection with the accompanying drawings which show, for the purposes of illustration only, one embodiment in accordance with the present invention, and wherein:

The single FIGURE is a partially schematic view of a control arrangement for controlling the air supply and fuel quantity to an auxiliary combustion chamber of a supercharged internal combustion engine in accordance with the present invention.

Referring now to the single FIGURE of the drawing, according to this FIGURE, an internal combustion engine 11 is supplied with precompressed charging air by a turbocharger generally designated by the reference numeral 12 which includes an exhaust gas turbine 13 and a compressor 14. The charging air from the compressor 14 is supplied through a charging air line 17 and passes through a charging air cooler 15 prior to entering the cylinder 16 of the internal combustion engine 11. A line 18 branches off from the charging air line 17 and feeds combustion air to an auxiliary combustion chamber 19. Fuel, injected through a fuel line 22 into the auxiliary combustion chamber 19, is ignited or burned in the combustion chamber 19 with the resultant exhaust gas traveling through an exhaust line 20 to an exhaust gas line 21 of the internal combustion engine 11 so as to be available for the exhaust gas turbine 13 as a driving gas in addition to the exhaust gas supplied from the internal combustion engine 11 itself.

The power of the auxiliary combustion chamber 19 is controlled in such a manner that gas production is sufficient to make up for any deficit in the amount of exhaust gas from the internal combustion engine 11 whereby the supercharger 12 is capable of producing a constant charging air pressure in the charging air line 17. However, the charging air pressure which is produced solely from the exhaust gas volume of the internal combustion engine 11 under a full load must not be exceeded.

The throttle valve 23 is arranged in the lining 18 and is adjustable by a controllable electromagnet 25 so as to determine the volume of air reaching the auxiliary combustion chamber 19 while the fuel volume required for such air volume is delivered by a pump 24. The delivery volume of the pump 24 can be varied by an adjustable variable speed electric motor 26.

The position of the throttle valve 23 and the rotation speed of the electric motor 26 are controlled by an electronic circuit as a function of the charging air pressure in the charging air line 17. For this purpose, a sensor 27 of a pressure gauge 28 is mounted in the charging air line 17. The pressure gauge 28 produces a natural value signal corresponding to an instantaneous charging air pressure. The actual value signal is fed to a comparator 30 by way of an input amplifier 29 and is compared in the comparator 30 with a guide parameter provided by a set value establishing device 32 corresponding to the desired constant charging air pressure. The resultant differential between the actual value signal and the desired value signal forms an input signal to proportional control means 31. The output signal from the proportional controller 31 is an amplification of the input signal and is proportional to the resultant differential within the limitations of the proportional band. The output signal from the controller follows the input signal with a phase change. This signal is used to shape two curve adjustment elements 33 and 34 which are connected in series with an air supply regulator 35 and force amplifier 36. These so called curve adjustment elements 33 and 34 provide a characteristic curve from the signal out of the proportional controller 31. The air supply regulator 35 is also formed as a proportional controller and along with the force amplifier 36 controls the fuel volume fed to the auxiliary combustion chamber 19. The input signal for the air supply regulator 35 is the deviation determined in the comparator 38. This deviation is the difference between the correct output signal of curve adjustment element 33 and the signal produced by position sensor 37 for the correct position of the throttle valve 23.

An output signal of an air supply regulator 35 forms a control parameter for the electromagnet 25 which has a continuously adjustable displacement or travel path. A correct position of the throttle valve 23 as stated above is monitored by a position sensor 37 and transmitted to a comparator 38 in the form of a signal. At the comparator 38 the signal from the position sensor 37 is compared with the output signal from the curve adjustment 33 and only the resultant differential serves as the actual input signal to the air supply regulator 35.

A force amplifier 36 delivers an output signal in the form of a variable supply voltage to the electric motor 26 of the fuel pump 24. An automatic reverser 39 is interposed between the proportional regulator 31 and the curve adjusting element 34 for fuel volume control. The reverser is operated by the switching arrangement 45 which is shaped as an electromagnet. The reverser changes its position when a predetermined limiting value of the charging air pressure is reached. A switch command is given to the reverser 39 by a limiting value sensor 42.

A first switch position of the reverser 39 as illustrated in the figure causes the output signal of the proportional controller to be ineffective with respect to the curve adjustment element 34 beginning at a start of operation of the combustion chamber 19. The aforementioned first switch position passes the actual value signal through another amplifier 41 to the curve adjustment element 34 after such actual value signal is decoupled at the position designated 40. The value of the signal from amplifier 41 is proportional to the instantaneous charging air pressure. This switching arrangement insures that when the auxiliary combustion chamber 19 begins operation, the output signal of the proportional control 31 is initially effective only on the air supply controller 35, while the force amplifier is influenced by a signal which is proportional to the charging air pressure.

The actual value signal produced by amplifier 41 is decoupled at the position designated 46 and is fed to a limiting value transmitter 42. If the actual value signal reaches or passes the adjusted, predetermined limiting value of the charging air pressure given in the limiting value transmitter 42, the switching arrangement 45 will be activated and reverser 39 will come into its other operating position. When the reverser 39 is in its other operating position, the output signal of the proportional controller 31 is fed to the force amplifier 36. At the first switch position illustrated in the drawing of the reverser 39, and at start of operation of the combustion chamber, the output signal of the proportional controller 31 is initially effective only on the air supply controller 35.

In this operating phase, the charging air pressure in the charging air line 17 exhibits a considerable differential relative to the set value of the said value establishing device 32. The considerable pressure differential can only be eliminated by delivering a corresponding amount of driving gas to the exhaust gas turbine 13 of the turbocharger 12 from the auxiliary combustion chamber 19. The control pulse for the air supply controller 35 which comes from the proportional controller 31 is therefore adjusted so that the throttle valve 23 assumes a maximum air throughput or maximum volume position. In this initial operating phase, after the auxiliary combustion chamber cuts in or is set in operation, the air volume initially available to the auxiliary combustion chamber 19 is relatively small because the charging air pressure is still low and the two parameters are proportional to one another. However, because of switch position of the reverser 39, the force amplifier 36 is not influenced by the output signal from the proportional controller 31 but by the output signal from the amplifier 41 which, as mentioned above, represents a parameter proportional to an instantaneous charging air pressure. This means that, at a low charging air pressure, such as that which exists at the beginning or start of operation of the auxiliary combustion chamber 19, as a rule, the fuel pump 24, controlled by the force amplifier 36, is caused to operate only at a correspondingly low delivery volume. The auxiliary combustion chamber 19 is thereby supplied with fuel in a ratio which corresponds to the volume of combustion air available so that optium combustion is insured from the very start of operation.

When the charging air pressure reaches a predetermined limiting value, the limiting value sensor 42 executes a switch command which causes the automatic reverser 39 to move to its other switch position. This produces normal operating conditions for the control system wherein the control pulses from proportional controller 31 also act upon the force amplifier 36. The position of the throttle valve 23 and the delivery volume of the pump 24 are then modified by the signal of the proportional regulator 31 which signal is proportional to an established pressure differential.

By feeding additional gas from the auxiliary combustion chamber 19 to the exhaust gas turbine 13 of the turbocharger 12, under favorable operating conditions for the exhaust gas turbine 13, there may be the danger of overheating. To avoid this potential operating danger, a sensor 43 of a temperature limiting value detector 44 is disposed forwardly or upstream of the inlet of the exhaust gas turbine 13 in the exhaust gas line 21. When the predetermined temperature limit is exceeded, the temperature limiting value detector 44 controls the output of the force amplifier 36 to control the fuel volume in such a manner so as to reduce the fuel volume to the auxiliary combustion chamber 19. Since the auxiliary combustion chamber 19 will then operate with a greater excess of air, the temperature of the resulant exhaust gases will correspondingly drop.

While electronic circuit elements have been referred to hereinabove, for attaining the function of the control system of the present invention, it is to be understood that it is possible also to use pneumatic or hydraulically operated logic elements or their combinations.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. In an arrangement for an internal combustion engine having a means for supercharging the engine comprising an exhaust gas turbine and a compressor,
   a control mechanism comprising
   an auxiliary combustion chamber for supplying additional exhaust gas to the exhaust gas turbine.
   means for metering fuel into the auxiliary combustion chamber, valve means for supplying supercharged air from said means for supercharging to said auxiliary combustion chamber,
   means for comparing a signal representing a pressure of supercharged air from said means for supercharging with a signal representing a guide parameter to produce a resultant signal,
   means for controlling the valve means in response to the resultant signal,
   further means for controlling the means for metering in response to the resultant signal,
   means for generating an output signal upon the pressure of said supercharged air passing a limit value of pressure, and
   means for interrupting the operation of the further means in response to said output signal.

2. An arrangement for an internal combustion engine as set forth in claim 1, wherein said means for interrupting comprises
   means for interrupting the operation of the further means in response to an output signal of magnitude less than the limit value of pressure.

3. An arrangement for an internal combustion engine as set forth in claim 1, comprising
   means for controlling the means for metering fuel in response to a signal representing the magnitude of the temperature of the exhaust gases from said engine and said auxiliary combustion chamber.

4. An arrangement for an internal combustion engine as set forth in claim 1, said means for controlling the valve means in response to the resultant signal comprising
   means for modifying the control of the valve means in accordance with a characteristic curve.

5. An arrangement for an internal combustion engine as set forth in claim 1, said further means for controlling the metering means comprising
   means for modifying the control of the metering means in accordance with a characteristic curve.

6. An arrangement for an internal combustion engine as set forth in claim 1, the means for controlling the valve means comprising
   means for controlling the valve means in response to a signal representative of the position of the valve means.

7. An arrangement for an internal combustion engine as set forth in claim 2, comprising
   means for supplying the further means for controlling the means for metering with said signal representing a pressure of supercharged air from said means for supercharging during the period of interruption.

* * * * *